United States Patent
Conant

[15] 3,660,590
[45] May 2, 1972

[54] ELECTRO-OPTICAL FLUIDIC TRANSFER CONDUIT

[72] Inventor: James E. Conant, 710 Peachtree St. N.E., Atlanta, Ga. 30308

[22] Filed: Nov. 23, 1970

[21] Appl. No.: 91,622

[52] U.S. Cl..............................174/47, 174/70 R, 174/74 R, 339/15, 350/96 B
[51] Int. Cl.....................F16l 11/12, H01b 7/00, G02b 5/16
[58] Field of Search..................174/8, 47, 70 R, 74 R; 128/6, 128/7, 8; 137/560; 339/15, 16 R, 147 R; 340/320, 380; 350/96 B

[56] References Cited

UNITED STATES PATENTS

| 731,496 | 6/1903 | Poirier et al. ...............................128/8 |
| 3,021,834 | 2/1962 | Sheldon....................................128/6 |
| 3,091,235 | 5/1963 | Richards............................350/96 B X |
| 3,305,689 | 2/1967 | Leavy, Jr. et al. .............350/96 B UX |
| 3,437,803 | 4/1969 | Seitz et al. .....................350/96 B UX |

FOREIGN PATENTS OR APPLICATIONS 1,511,373  12/1967  France........................................128/6

*Primary Examiner*—Laramie E. Askin
*Attorney*—Newton, Hopkins & Ormsby

[57] ABSTRACT

A transfer conduit capable of transmitting one or a combination of energy signals of varying characteristics. The transfer conduit is constructed of a series of filaments which are uniformly twisted along the length thereof in close contacting relationship to define therebetween an axially fluid flow passageway. The term "twisted" is meant to include braiding, entwining, or the like. A coating of impervious material is provided around the outer exposed surface of the twisted filaments for sealing the same against leakage and for securing the lengths of the twisted filaments in the twisted state. Certain of the filaments are constructed of a material which is capable of transmitting light signals therethrough. Certain other of the filaments are constructed of a material capable of transmitting electrical signals therethrough. The fluid flow passageway defined between the twisted filaments is capable of transmitting a fluid signal.

6 Claims, 11 Drawing Figures

Patented May 2, 1972

INVENTOR
JAMES E. CONANT

BY
Newton, Hopkins & Ormsby
ATTORNEYS

INVENTOR.
JAMES E. CONANT
BY
Newton, Hopkins & Ormsby
ATTORNEYS

3,660,590

ELECTRO-OPTICAL FLUIDIC TRANSFER CONDUIT

BACKGROUND OF THE INVENTION

This invention relates in general, to devices capable of performing functions utilizing optic, fluidic and electrical energy signals but more particularly to a transfer conduit for transferring, one of a combination of signals, into a single device capable of utilizing a control signal or pulse to perform an act of work.

The device can be utilized most favorably at the interface of the utilized systems and for the long delay signal passageways of the fluidic system. The device can be fabricated to utilize fluid pressure at less than atmospheric pressure without the wall thickness necessary to prevent the collapse of the passageway by the external pressure and bending of the tube walls. Arrangements having space limitations at the interface of the different systems, can be overcome by the compactness of the device in providing fluid passageways having diameters on the order of thousandths of an inch, which are necessary in some cases to control the flow rate of the fluid amplification control devices.

The art of utilizing optical fibers or that of sending light energy down a highly transparent filament, usually composed of glass or plastic, is widely practiced. Filament diameters can be quite small, on the order of one-five hundreth of an inch.

The use of fluidic systems utilizing a number of liquids or gases to perform many functions, without the use of moving parts and under adverse conditions, is well known and used in many technologies.

Many systems have been devised capable of transferring electrical control energy pulses along a filament for use in magnetic systems of signal transfer.

There are numerous prior art transfer conduits capable of transferring any one of the above identified energy signals independently. Further, a number of transfer conduit means have been devised which are capable of transferring at least two of the above identified energy signals simultaneously. However, none of the prior art transfer conduit means are capable of transferring a combination of all three of the above identified energy signals simultaneously.

A prior art system which would be capable of transferring a combination of three of the above identified energy signals simultaneously would consist of a number of transfer conduits and the use of a number of transfer conduits, one capable of transferring each of the above identified signals would consume an excessive amount of space and would be difficult to manipulate and control. Further, a prior art system of conduits which would be capable of transferring a combination of the three above identified energy signals simultaneously would be complex in construction, uneconomical to manufacture and unreliable in operation.

SUMMARY OF THE INVENTION

It is therefore a primary object of this invention to provide a transfer conduit means capable of transferring a combination of energy signals of varying characteristics.

A further object of this invention is to provide a transfer conduit means capable of transferring simultaneously an electrical energy means, a fluid energy means and an optical energy means.

Another object of this invention is to provide a novel transfer conduit offering a very narrow fluid flow passageway.

A still further object of this invention is to provide a novel tubular transfer conduit means having a very narrow fluid flow passageway combined with an optical filament to transport both optic signals and fluid signals simultaneously.

Still another object of this invention is to provide a novel transfer conduit means having a narrow fluid flow passageway combined with filaments capable of carrying electrical or magnetic pulses simultaneously.

Another object of this invention is to provide a novel transfer conduit means having a very narrow fluid flow passageway combined with filaments capable of carrying electrical or magnetic pulses combined with optic filaments capable of carrying the combined system simultaneously.

A still further object of this invention is to provide an interface means capable of being combined with the novel transfer conduit means for inducing information for transfer through the filaments of electrical and optic characteristics and along the fluid flow passageway defined therebetween.

An additional object of this invention is to provide a transfer conduit means capable of transmitting a combination of energy signals of varying characteristics which is simple in construction, economical to manufacture and reliable in operation.

The foregoing and other objects are obtained by a passageway construction formed by twisting or braiding a plurality of elongated filaments in a rope-like fashion to forcibly close the surfaces of the filaments together along the entire length thereof and in this manner provide a central elongated fluid flow passageway therebetween. A suitable material is extruded over the outer exposed surfaces of the twisted filaments for sealing the passageway construction formed thereby. This construction is especially suitable for use in fluid systems requiring a very small passageway for the control system and fluidic amplification devices.

Still other objects and advantages of the details of construction will become apparent upon reading the following description of the illustrative embodiments of the invention, with reference to the attached drawings wherein like reference numerals have been used to refer to like parts throughout the several figures and wherein:

DESCRIPTION OF THE ILLUSTRATIVE EMBODIMENT

Figure 1:
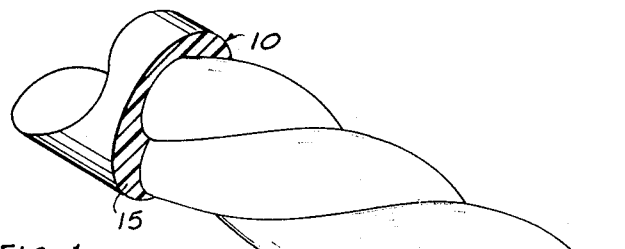
FIG. 1 is a fragmentary perspective view of a transfer conduit constructed according to the present invention, with certain parts broken away and shown in section for purpose of clarity.

Referring now to the drawings, and more particularly to FIG. 1, the transfer conduit 10 of the present invention is shown formed of three generally smooth surface strands of filaments 11, 12 and 13 of a suitable ductible material, such as drawn metal strands, glass strands, plastic strands or strands of other suitable material usually of a non-absorbant characteristic. The filaments 11–13 are twisted or braided along the entire axial lengths thereof by any suitable means in the same manner that a cord or rope is fabricated. The twists are equalized in order to cause the surfaces of the filaments 11–13 to be in close contact with each other along the entire lengths of the conduit, to define an axial fluid flow passageway 14 of uniform cross-sectional configuration.

An impervious and continuous coating 15 of a suitable plastic or resin-based matrix is applied to the outer exposed surfaces of the twisted or braided filaments 11–13 to seal the enclosed area of passageway 14 for permitting fluids to be transmitted therethrough. The coating 15 is of such composition and consistency at the time of application to the outer surfaces of the filaments 11–13 that the seepage through the contacting surfaces of the filaments into the passageway 14 is prevented, and in this manner, the diameter and configuration of the enclosed passageway are maintained. One manner in which the coating material 15 may be applied, is like that in which insulation is applied to electric cables and the like by heat and pressure application, in the extrusion of polyethylene thereon. As shown in FIG. 1, the cross-sectional geometric configuration of the passageway 14 is substantially triangular. However, the cross-sectional configuration of the passageway is dependent upon the number of filaments utilized in the forming of the passageway 14. In the use of four such filaments the cross-sectional configuration would be substantially square.

Figure 2:
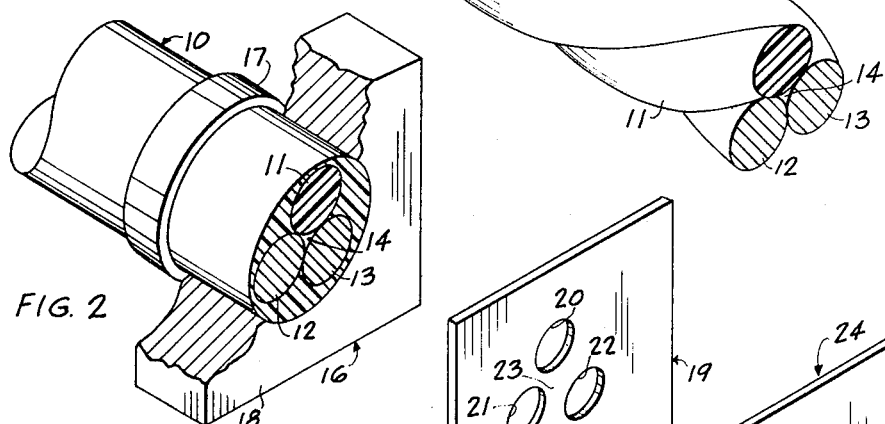
FIG. 2 is a fragmentary perspective view of an end portion of a transfer conduit of FIG. 1 shown in combination with a support form, with certain parts broken away and shown in section for purpose of clarity.

As shown in FIG. 2, a support form 16 is provided to secure the conduit 10 into the position necessary for effecting an input or output of the signal pulses. A spacing collar means 17 is provided on conduit 10 for maintaining the support form 16 in proper alignment with the conduit end so that the exposed filaments are held even with the surface plane 18 of the support form 16. Conduit 10 is shown herein as connected to support form 16 by a force fit. However, other suitable means of fitting and affixing conduit 10 into the support form, either permanently or so as it can be easily removed can be provided. The support form 16 is provided with an aperture detailed to receive the force fit of conduit 10. Filament 11 is herein designated the optical fiber and the two filaments 12, 13, shown herein, are designated to be capable of conducting an electrical current independently of each other through the conduit 10 and can be insulated, if the conditions for operation require it.

Figure 3:
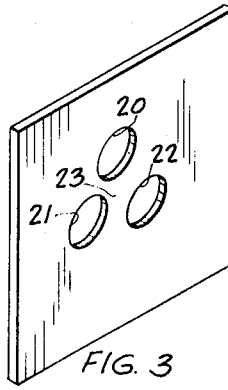
FIG. 3 is a perspective view of a signal control plate to be used in combination with the transfer conduit device of FIGS. 1 and 2.

A signal control plate 19 is shown in FIG. 3 and is represented herein as having more or less flexible properties and of a generally nonconducting material. Signal control plate 19 is provided with three openings 20, 21, and 22. When plate 19 is positioned properly against the surface plane 18 of form 16, the openings 21, 22 will be aligned with filaments 12, 13 to permit the flow of electrical current therethrough by a system of contacting electrical transmitting connection, as will be described in more detail herein below. In the aligned position, light can flow through control plate opening 20 to the optical filament 11. The signal control plate 19 will not permit the flow of fluid into the passageway 14 as a signal source because the unperforated area 23 is provided between the three openings 20–22.

Figure 4:
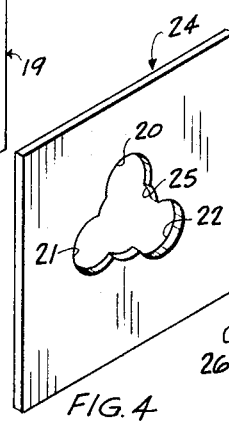
FIG. 4 is a perspective view similar to FIG. 3 showing an alternate form of a signal control plate.

As shown in FIG. 4, an alternate signal control plate 24 is provided. Signal control plate 24 is similar to signal control plate 19 except that an opening is provided between the three openings 20–22 in place of the unperforated area 23, to allow unobstructed flow of fluid into the passageway 14 of the transfer conduit 10. As shown, projecting portions 25 intervene between openings 20–22.

Figure 5:
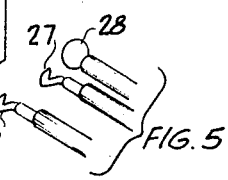
FIG. 5 is a perspective schematic illustration of a number of signal transmitting devices for use in combination with the novel transfer conduit means of FIGS. 1-4.

A signal transmitting means is shown in FIG. 5. The signal transmitting means includes two scanning spring contacts 26 and 27 for transmitting an electrical signal from a conventional electrical system into conducting filaments 12, 13. The electrical signals will flow into the transfer conduit 10 when not prevented by openings 21, 22 of the control signal plates 19, 24 being closed or blocked by conventional means (not shown). The source of the optic signal is indicated as an electrical light bulb 28, though other light sources can function as well.

The fluid system is to be atmospheric air, though other fluid systems can function as well. The atmospheric air is induced into the passageway 14, the flow induced by an injector system (not shown). The fluid flow passageway 14 is open or closed by the perforated or unperforated area of the signal control plates 19, 24. A positive pressure system, one utilizing a higher pressure in the passageway than on the exterior of the tube device, can be adapted for a similar signal inducing system. The inducted fluid flow can assist the generation of the fluid signals or pulse formation by the pressure of the unperforated area of the signal control plates 24 against the orifice of the passageway 14 of the transfer conduit 10. The inducted fluid flow is especially adapted to this transfer conduit 10 since the coating 15 on the filaments 11–13 need only be of such thickness as to be impermeable to the induced fluid and the external fluid conditions. The crush-resistance of the substance comprising the filaments 11–13 are of a greater magnitude, in general, than the external pressure would be. This crush-resistance assists in reducing the wall thickness required when compared to pressure systems operating at more than atmospheric pressure.

Figure 6:
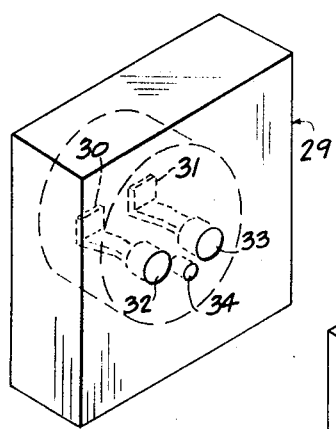
FIG. 6 is a perspective view of an attachment for use in combination with the novel transfer conduit.

As shown in FIG. 6, an attachment device 29 is provided for attachment to or to be formed as an integral part of the support form 16, shown in FIG. 2. The purpose of attachment device 29 is to serve as a more uniform surface or plane, for the transfer of signals into the different systems and so that the frictional wear by the moving signal initiating device is not borne by the exposed end surface of filaments 11–13. Attachment device 29 is provided with a pair of electrical contacts 30, 31 having connecting jacks 32, 33, respectively. Contacts 30, 31 are supported for electrical contacting engagement with the electrical filaments 12, 13. Attachment 29 also includes a fluid flow opening 34 adapted to be connected in fluid flow communication with passageway 14.

The electrical systems need not be on the longitudinal axis of the transfer conduit 10 except for the surfaces 30, 31 contacting the end of filaments 12, 13. The electrical jacks 32, 33 on the exposed plane surface of the attachment device 29 can be located for the convenience of the signal initiating areas of the signal device. The fluid aperture 34 likewise need not be located on the longitudinal axis of the fluid flow passageway 14 of the transfer conduit 10, but can be located for the convenience of the signal initiating area of the signal control device. An aperture means (not shown) for the optical system, for optimum results, should be located on the longitudinal axis of the optical filament 11 of the transfer conduit.

Figure 7:
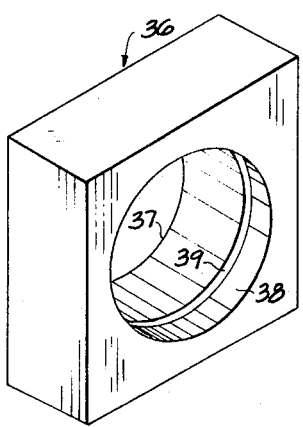
FIG. 7 is a perspective view similar to FIG. 6 showing an alternate form of an attachment device for use in combination with the novel transfer conduit means.
Figures 8, 9:
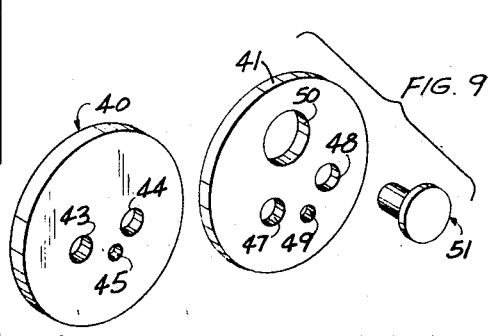
FIG. 8 is a perspective view of an insert control plate detailed for use in combination with the support device of FIG. 7.
FIG. 9 is an exploded perspective view of an alternate form of a signal control plate and an optical prism lens means.

An alternate attachment device 36, as shown in FIG. 7, is provided for attachment to or to be formed as an integral part of the transfer conduit 10, shown in FIG. 2. Attachment device 36 is provided with an opening 37 extending therethrough. Opening 37 includes an end portion 38 of increased diameter defining a shoulder abutment surface 39. Opening end portion 38 is detailed to receive either a complementary insert member 40 (FIG. 8) or complementary insert member 41 (FIG. 9). The insert member 40, shown in FIG. 8, is adapted to be affixed into the enlarged end portion 38 in such a manner that the abutting edges are detailed to be impermeable to fluids. The electrical connections are only alluded to by the apertures 43, 44 formed in insert member 40 and fluid is transmitted therethrough by a fluid aperture 45.

The object of insert member 41, shown in FIG. 9, is to provide a system to correct, intensify and direct the flow of light into the optic system. The insert member 41 is designed to be fitted into the aperture end portion 38 utilizing like procedures as provided for insert 40 mentioned herein above. The electrical system connections are alluded to by apertures 47, 48 formed in insert member 41. The fluid system is transmitted through an aperture 49 formed in insert 41. Insert member 41 is also provided with an optical system aperture 50 detailed to accommodate an optical lens means 51. Lens means 51 serves as a prism lens or sighting window. In an assembled relationship, the lens means 51 is inserted in aperture 50 so as to be impervious to fluid.

Figure 10:
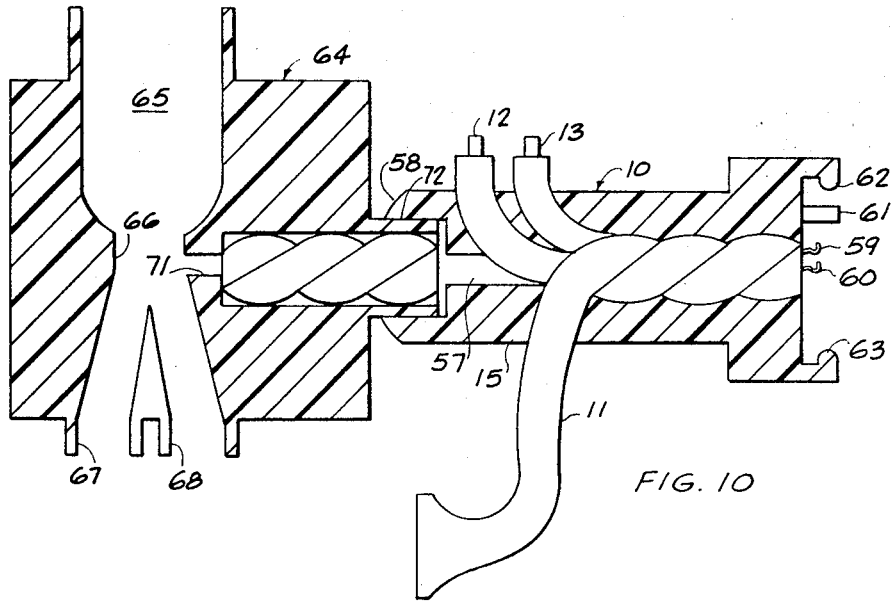
FIG. 10 is a sectional view showing the transfer conduit means assembled in combination with a signal receiving system.

Referring now particularly to FIG. 10, a transfer conduit constructed according to the present invention is illustrated in combination with a connecting element and a fluid signal receiving means. The transfer conduit, shown in FIG. 10, includes two electrical filaments 12, 13 and an optical filament 11. Electrical filaments 12, 13 extend in a first direction from the longitudinal axis of the transfer conduit 10 and optical filament 11 extends in a second direction from the longitudinal axis of the transfer conduit. The fluid passageway 14 situated between the encompassing filaments 11–13 is continuous and connected to a passageway 57 formed in the impervious coating 15 which surrounds filaments 11–13. A right end of transfer conduit 10, as shown in FIG. 10, includes a number of connecting elements 62, 63 detailed for releasably connecting an end of the transfer conduit 10 to a second transfer conduit having elements complementary to the connecting elements 62, 63, as will be described in more detail herein below.

Extending from the right end of the electrical filaments 12, 13 is a pair of electrical contact devices 59, 60 which are detailed to be compressible when the conduit 10 is connected to a second transfer conduit as indicated herein above. The electrical contacts 59, 60 will provide an electrical connecting means between the filaments 12, 13 of one transfer conduit and the electrical filaments of a second transfer conduit. An alignment projection means 61 is formed on a right end of transfer conduit 10 for effecting a proper alignment of one transfer conduit 10 with a second transfer conduit. The second transfer conduit would include a detent opening (FIG. 11) complementary to projection 61 whereby the electrical contacts 59, 60 would be properly aligned with the electrical filaments of a second transfer conduit.

The electrical filaments 12, 13 are illustrated in FIG. 10 as extending in one direction with the optical filament 11 extending in an opposite direction. The purpose of extending the filaments 11–13 from the transfer conduit 10 is to allow a signal transmitted thereby to be received by signal control means (not shown) located adjacent thereto. However, the filaments 11–13 can be formed to extend away from transfer conduit in any direction desired.

A left end 58 of transfer conduit 10 (shown in FIG. 10) is provided with a socket portion detailed to receive by conventional force fit means a complementary projection 72. Projection 72 is formed integral with a fluid signal control device 64. Signal control device 64 includes a fluid flow passageway 65 extending from top to bottom therethrough as shown in FIG. 10. The fluid flow passageway 65 is provided with an orifice area 66. Immediately below the orifice 66, the passage divides into a pair of passageways 67, 68. Fluid transmitted through the transfer conduit 10 will pass along the passageway 14 into a fluid flow passageway 71 provided in the signal control receiving device 64. The fluid flow passageway 71 formed within the signal control device 64 is shown to be formed by twisted filaments means which will define a fluid flow passageway substantially as indicated above in the transfer conduit. However, the fluid flow passageway 71 could be formed by any conventional means which would provide a passageway of fluid therethrough.

In an operation of controlling a signal by the signal control device 64, fluid will be directed along fluid flow passageway 65 through the orifice 66 and would be divided into two fluid streams which would be directed along the fluid flow passageway 67, 68. A fluid pulse signal transmitted through the transfer conduit 10 could be used to control the direction of the fluid streams through either the fluid passageway 67 or fluid passageway 68. As fluid is transmitted through the orifice 65, an increase in a fluid pulse signal transmitted through conduit 71 would direct the fluid stream along the passageway 67 and a decrease in the fluid pulse signal transmitted through passageway 71 would allow a portion of the fluid stream to pass through the passageway 68. Therefore, as described herein above, the transfer conduit 10 can be utilized to transmit a fluid pulse into a signal control element 64 for effecting a work function of fluid being transmitted therethrough.

Figure 11:
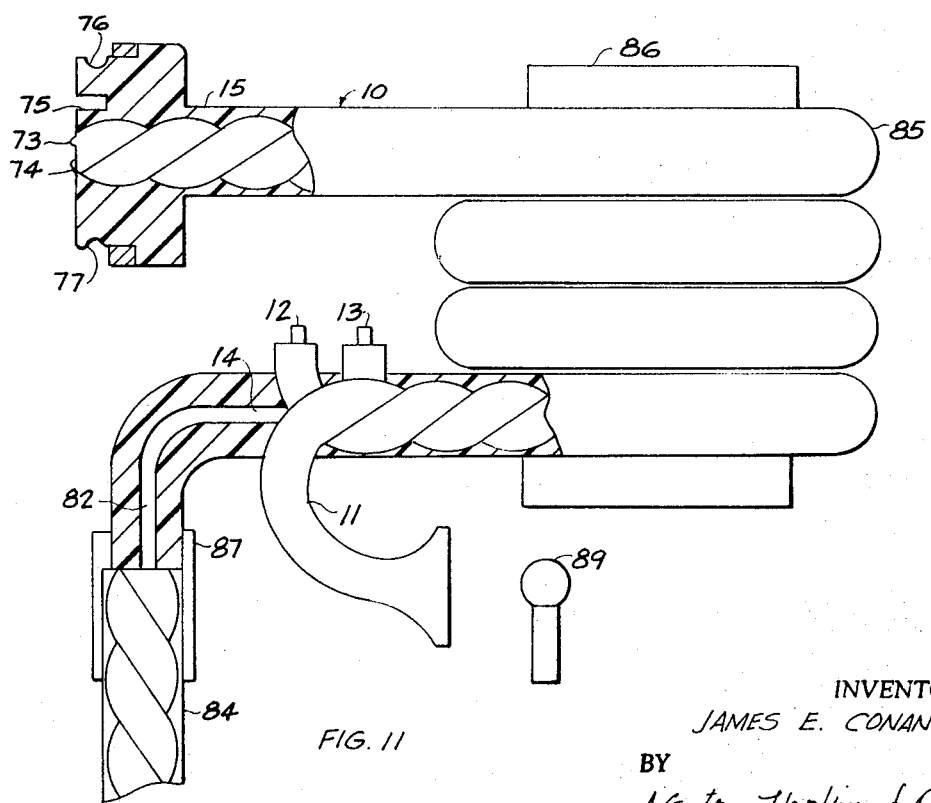
FIG. 11 is an illustration of the transfer conduit means constructed according to the present invention, with the conduit shown in combination with a releasable connecting element a number of fluid delay coil means and signal receiving means, with certain parts broken away and shown in section for purpose of clarity.

As shown in FIG. 11, a second utilization of the transfer conduit 10 is illustrated. The transfer conduit 10 of FIG. 11 includes a first end having a connecting means which includes notched connecting portions 76, 77. Notched connecting portions 76, 77 are complementary to the projecting elements 62, 63, shown in FIG. 10. The connecting element also includes a detent alignment opening 75 complementary to the alignment projection 61 shown in FIG. 10. The two electrical filaments 12, 13, are provided with contact surface portions 73, 74 which will be connected in electrical communication with the compressible contact 59, 60. With the alignment projection 61 properly fitted within detent opening 75, the electrical contacts 73, 74 will be in proper alignment with the compressible electrical contacts 59, 60. In this position, an optical filament 11 will be in light flow communication with a corresponding optical filament 11 provided in the transfer conduit of FIG. 11. In an assembled or connected relationship, the fluid flow passageway 14 formed by the filaments 11–13 will be in fluid flow communication with a corresponding passageway of a connected transfer conduit.

As shown in FIG. 11, the transfer conduit 10 includes a number of coil portions 85 which are wound around a shaft means 86. The coil portions 85 will serve as a fluid delay line means for the transfer conduit and the number of coils can be increased or decreased as required by the systems utilizing the transfer signals.

A second end of the transfer conduit of FIG. 11 is detailed such that the two electrical filaments 12, 13 extend in one direction and the optical filament 11 extends in a second direction with the fluid flow passageway 14 being continuous with a fluid flow passageway 82 provided in an extended portion of the impervious coating 15. An extended end of the impervious coating 15 is curved and provided with a force fit collar element 87 for connection with an additional transfer conduit means 84. The transfer conduit means 84 is shown constructed of twisted filaments. However, the transfer conduit 84 could be formed by any conventional means which would satisfy the requirements of the fluid conducting system. Also shown in FIG. 11 is a light transmitting element 89. The light transmitting element 89 is in the form of a conventional light bulb. However, any conventional light transmitting means could be utilized for directing a light signal through the optical filament 11 or receiving a light signal transmitted therethrough.

OPERATION

The transfer conduit 10 of the present invention can be utilized to transfer a combination of electrical, optical and fluid signals therealong from a signal transmitting system to a signal receiving and control system. The transfer conduit can be constructed as one integral length of conduit means which would extend from the transmitting system to the signal receiving system or could be constructed of a number of sections which are connected together by complementary connected means 62, 63, 76 and 77, as shown in FIG. 10 and 11. The twisted filaments 11–13 which form the fluid flow passageway 14 also served as filaments for transmitting electrical signal and optical signals. The electrical filaments 12, 13 can extend at an angle relative to the longitudinal axis of the transfer conduit as required by a connected electrical receiving or transmitting system. Also, the optical filament 11 can extend at an angle to the longitudinal axis of the transfer conduit for communication with optical transmitting and receiving systems. Where the filaments 11–13 extend in directions angularly disposed relative to the longitudinal axis of the transfer conduit 10, the fluid flow passageway 14 can be formed to extend away therefrom in any direction as desired by a continuation of the formed impervious coating 15.

As described herein above, the fluid pulse transmitted along the fluid flow passageway 14 can be utilized to effect a work function in a fluid signal control device, as shown in FIG. 10 and identified with the reference numeral 64. The fluid pulse transmitted through the transfer conduit 10 along the fluid flow passageway 14 can be utilized to alter the direction of a fluid stream passing through the signal control device 64 by increasing or decreasing the pressure of the pulse passing through the transfer conduit passageway 14. An electrical signal transmitted along electrical filaments 12, 13 can be utilized to control a number of electrical receiving signals for performing various work functions in response to a transmitted signal. Also, a light signal transmitted along the optical filament 11 can be utilized to operate a conventional light workable system which is controlled by light signals transmitted thereto.

It now becomes apparent that the above stated illustrated embodiments of the present invention are capable of obtaining the above stated objects and advantages. It is obvious that those skilled in the art may make modifications in the details of construction without departing from the spirit of the invention which is to be limited only by the scope of the appended claims.

What is claimed is:

1. A transfer conduit capable of transmitting one or a combination of energy signals of varying characteristics comprising a plurality of filaments of smooth impervious ductile material uniformly twisted along their lengths in close contacting relationship to provide a uniform longitudinal passage between said filaments, at least one of said filaments being of a material capable of transmitting light energy signals and at least one other of said filaments being of an electrically conductive material, and a continuous coating of impervious material surrounding the outer exposed surfaces of said filaments.

2. A transfer conduit as in claim 1 wherein said filaments are all of the same diameter.

3. A transfer conduit as in claim 1 wherein said conduit consists of three twisted filaments forming a longitudinal passage of substantially triangular cross section.

4. A transfer conduit as in claim 1 further including connecting means at each of its ends for placing said longitudinal passage in communication with fluid conduits.

5. A transfer conduit as in claim 4 further including means at each end for operatively connecting the optical and electrical transmitting filaments with corresponding conductors adapted to impart signals to or receive them from said filaments.

6. A transfer conduit as in claim 5 including means for releasably holding said connecting means in operative relationship with a fluid conduit, an electrical conductor and an optical conductor.

* * * * *